(12) United States Patent
Lin et al.

(10) Patent No.: US 11,746,992 B1
(45) Date of Patent: Sep. 5, 2023

(54) ULTRASONIC WELDING METHOD FOR LAMP HOLDER AND LIGHT STRING AND LIGHT STRING MANUFACTURED BY THE METHOD

(71) Applicant: ZHANGZHOU GO WIN LIGHTING CO., LTD, Zhangzhou (CN)

(72) Inventors: Xiongzhong Lin, Zhangzhou (CN); Qingan Wu, Zhangzhou (CN); Bihai Wang, Zhangzhou (CN)

(73) Assignee: ZHANGZHOU GO WIN LIGHTING CO., LTD, Zhangzhou (CN)

( * ) Notice: Subject to any disclaimer, the term of this patent is extended or adjusted under 35 U.S.C. 154(b) by 0 days.

(21) Appl. No.: 17/902,924

(22) Filed: Sep. 5, 2022

(30) Foreign Application Priority Data

Jul. 28, 2022 (CN) .......................... 202210902009.6

(51) Int. Cl.
| | |
|---|---|
| *F21V 17/10* | (2006.01) |
| *F21V 21/002* | (2006.01) |
| *F21S 4/10* | (2016.01) |
| *F21V 23/00* | (2015.01) |
| *F21Y 115/10* | (2016.01) |

(52) U.S. Cl.
CPC .............. *F21V 17/101* (2013.01); *F21S 4/10* (2016.01); *F21V 21/002* (2013.01); *F21V 23/002* (2013.01); *F21Y 2115/10* (2016.08)

(58) Field of Classification Search
CPC .... F21V 17/101; F21V 21/002; F21V 23/002; F21S 4/10; F21Y 2115/10
See application file for complete search history.

(56) References Cited

U.S. PATENT DOCUMENTS

| | | | |
|---|---|---|---|
| 2013/0182439 A1* | 7/2013 | Tsai ........................ | F21V 23/06 362/249.06 |
| 2014/0315445 A1* | 10/2014 | Tsai ......................... | F21S 4/10 439/686 |
| 2020/0051965 A1* | 2/2020 | Tsai ........................ | F21V 23/06 |

* cited by examiner

*Primary Examiner* — Andrew J Coughlin
*Assistant Examiner* — Jessica M Apenteng

(57) ABSTRACT

In the present disclosure, ultrasonic welding is cleverly introduced to encapsulate the LED lamp, the rectifier, as well as other parts and components of a decorative light string, and the plastic outer shells with a specific structure cooperate with the ultrasonic welding lines, the glue overflow grooves, and the profiling raceway arranged on the plastic outer shells to enable a more reliable and efficient sealing of the LED lamp, the wire, the rectifier, as well as other parts and components encapsulated in the plastic outer shells. At the same time, ultrasonic welding will not cause the encapsulated objects to be in an overall high temperature environment nor impact the pins of components such as lamp holder or other parts connected to the wire during the welding process, avoiding the disconnection between the power cords and the components.

6 Claims, 5 Drawing Sheets

ULTRASONIC WELDING METHOD FOR LAMP HOLDER AND LIGHT STRING AND LIGHT STRING MANUFACTURED BY THE METHOD

CROSS-REFERENCE TO RELATED APPLICATIONS

This application is based upon and claims priority to Chinese Patent Application No. 202210902009.6, filed on Jul. 28, 2022, the entire content of which is incorporated herein by reference.

TECHNICAL FIELD

The present disclosure relates to the technical field of light fixture processing, and particularly to an ultrasonic welding method for a lamp holder and a light string, and a light string manufactured by the method.

BACKGROUND

Decorative light fixtures, as an important tool for providing daily light and heightening atmosphere, have been widely used indoors and outdoors. Light strings are a kind of commonly used decorative light fixtures. During outdoor use, to ensure long service life and use stability of a light string, high requirements are posed on the water resistance and tensile resistance of lamp holders of the light string and components connected thereto. At present, light strings are mostly subjected to an auxiliary processing through injection molding equipment for encapsulation. In this process, operators must put parts and components of a light fixture into corresponding areas of an injection mold in advance and then introduce a high-temperature molten plastic into the mold through an injection molding machine, such that lamps of a light string and components connected thereto that are encapsulated by injection molding can be obtained after cooling. During the injection molding, LED lamp wicks (below 70 degrees) will be significantly affected because the mold and the plastic raw material are often in a high temperature (about 200° C.) state. In particular, the LED lamp wicks are easily damaged under high temperature, making the light string encounter problems of dead light and a single light not working, which directly affects the yield rate in light string processing and the service life and stability in later use of the light string. In addition, encapsulation by injection molding requires a high pressure (above 88 Bar (89.5 kg/cm$^2$)), and such a high pressure will have an impact on power cords (i.e., wires) and pins of the LED lamp wicks, which may cause separation and disconnection of the power cords (i.e., wires) and the pins during product encapsulation. Furthermore, whether a light string produced by injection molding has an attractive appearance depends on factors including precision and clamping pressure of a mold. Generally, burrs will be generated on the outside of an encapsulated structure due to undesired precision or improper pressure of the mold, thereby resulting in defects in the appearance of a finished product, which leads to a less attractive appearance. In view of these problems, it is of great practical significance to improve the encapsulation stability of parts and components of a light string, obtain more attractive appearance of the light string, and enhance the processing adjustability and flexibility of the light string.

SUMMARY

In view of the above, the objective of the present disclosure is to provide an ultrasonic welding method for a lamp holder and a light string, which involves reliable implementations, convenient operations, good encapsulation effects, and little influence on LED lamps or other parts and components of a light string during encapsulation processing. Further, the present disclosure provides a light string manufactured by the method.

In order to achieve the above technical objectives, the technical solutions adopted in the present disclosure are as follows.

A light encapsulation structure suitable for ultrasonic welding includes a pair of plastic outer shells with a symmetrical structure. Each of the plastic outer shells is internally provided with a profiling raceway to allow the wire or component of a decorative light fixture to pass through.

The plastic outer shell is provided with first ultrasonic welding lines at two sides corresponding to the profiling raceway, and trajectories of the first ultrasonic welding lines are adapted to the side contour of the profiling raceway. The plastic outer shell is provided with glue overflow grooves on the side close to or away from the profiling raceway relative to the first ultrasonic welding lines.

In addition, the pair of plastic outer shells are welded together to form a single piece by ultrasonic waves. During the ultrasonic welding, the first ultrasonic welding lines on the pair of plastic outer shells are subjected to heat melting due to vibration and friction to become soft and melted, and the excess part thereof fills the glue overflow grooves.

As a possible implementation, further, two ends of the profiling raceway described in the present solution are both provided with second ultrasonic welding lines.

As a preferred implementation, the first ultrasonic welding lines and/or the second ultrasonic welding lines preferably have a triangular or rectangular cross-sectional contour before welding.

Based on the above, the present disclosure further provides a decorative light string, which includes a wire and two or more LED lamps connected to the wire. The LED lamp is encapsulated by the light encapsulation structure suitable for ultrasonic welding described above.

As a preferred implementation, in the present solution, the profiling raceway in the plastic outer shell of the light encapsulation structure for encapsulating the LED lamp includes:

a lamp holder insertion groove arranged at one end of the plastic outer shell, wherein the contour of the lamp holder insertion groove is adapted to the contour of the lamp holder of the LED lamp, the lamp holder of the LED lamp is inserted into the lamp holder insertion groove, so that the lamp holder is received inside the lamp holder insertion groove, the lamp holder insertion grooves of the pair of plastic outer shells enclose a lamp holder installation groove, and the lamp holder installation groove is in an interference fit with the lamp holder of the LED lamp;

a first wire insertion groove arranged at the other end of the plastic outer shell, wherein the contour of the first wire insertion groove is adapted to the contour of the unstripped wire, the tail end of the wire is inserted into the light encapsulation structure through the first wire insertion groove and connected to the lamp holder, so that the lamp holder of the LED lamp is electrically connected to the wire, the first wire insertion grooves of the pair of plastic outer shells enclose a first wire installation groove, and the first wire installation groove is in an interference fit with the wire;

a pin insertion groove arranged between the lamp holder insertion groove and the first wire insertion groove, wherein the lamp holder is provided with a pin for connecting with the wire, the contour of the pin insertion groove is adapted to the contour of the pin on the lamp holder, the pin of the lamp holder is inserted into the pin insertion groove, the tail end of the wire is inserted into the pin insertion groove for connecting with the pin of the lamp holder, and the pin insertion grooves of the pair of plastic outer shells enclose a pin installation groove.

As a preferred implementation, in the present solution, the second ultrasonic welding lines of the light encapsulation structure for encapsulating the LED lamp are preferably located in the middle of the lamp holder insertion groove and the middle of the first wire insertion groove along an axial direction, respectively.

As a preferred implementation, the present solution preferably further includes a plug connected to the wire and a rectifier connected to the wire and the LED lamp. The plug and/or the rectifier are/is encapsulated by the light encapsulation structure suitable for ultrasonic welding described above.

As a preferred implementation, in the present solution, the profiling raceway in the plastic outer shell of the light encapsulation structure for encapsulating the rectifier includes: a pair of second wire insertion grooves and a rectifier assembly accommodating groove.

The pair of second wire insertion grooves are respectively arranged at two ends of the plastic outer shell, and the rectifier assembly accommodating groove is located between the pair of second wire insertion grooves. The second wire insertion grooves of the pair of plastic outer shells enclose a second wire installation groove, the second wire installation groove is in an interference fit with the wire, and the rectifier assembly accommodating grooves of the pair of plastic outer shells enclose a rectifier assembly installation groove. The rectifier is arranged in the rectifier assembly accommodating grooves, and the wire is inserted into the rectifier assembly accommodating grooves through the second wire insertion grooves at two ends of the plastic outer shell and connected to the rectifier.

In addition, the second ultrasonic welding lines of the light encapsulation structure for encapsulating the rectifier are respectively located in the middle of the pair of second wire insertion grooves along an axial direction.

Based on the above, the present disclosure further provides an ultrasonic welding method for a lamp holder and a light string, which includes the decorative light string described above. The welding method includes:

S01, placing one of a pair of plastic outer shells in the mold of ultrasonic welding equipment, placing the LED lamp, the rectifier, or the plug in a corresponding area of the profiling raceway of the plastic outer shell, and then loading the other plastic outer shell into the mold of the ultrasonic welding equipment to make the pair of plastic outer shells face each other;

S02, closing the mold of the ultrasonic welding equipment, and starting the ultrasonic welding equipment to weld the pair of plastic outer shells under preset working parameters until the welding is completed;

S03, opening the mold of the ultrasonic welding equipment, and taking out a welded workpiece, so that the ultrasonic welding of the LED lamp, the rectifier, or the plug is completed.

As a preferred implementation, in S02 of the present solution, the ultrasonic welding is preferably conducted at an ultrasonic frequency of 20 KHz, a welding pressure of more than 5 kg, a delay time of 17-20 ms, a welding time of 20 ms, and a curing time of 20 ms.

By using the above-mentioned technical solutions, the present disclosure has the following advantages compared with the prior art. In the present disclosure, ultrasonic welding is cleverly introduced to encapsulate the LED lamp, the rectifier, as well as other parts and components of the decorative light string, and the plastic outer shells with a specific structure cooperate with the ultrasonic welding lines, the glue overflow grooves, and the profiling raceway arranged on the plastic outer shells to enable a more reliable and efficient sealing of the LED lamp, the wire, the rectifier, as well as other parts and components encapsulated in the plastic outer shells. At the same time, ultrasonic welding will not cause the encapsulated objects to be in an overall high temperature environment nor impact the pins of components such as lamp holder or other parts connected to the wire during the welding process, avoiding the disconnection between the power cords and the components. Furthermore, in the aspect of appearance, problems such as the occurrence of burrs or other defects can also be greatly reduced. Therefore, the present solution can effectively ensure the yield rate of components during the encapsulation process and the reliability of components in the later use.

BRIEF DESCRIPTION OF THE DRAWINGS

In order to illustrate the embodiments of the present disclosure or the technical solutions in the prior art more clearly, accompanying drawings that need to be used in the descriptions of the embodiments or the prior art will be briefly introduced below. Obviously, the accompanying drawings described below are only some embodiments of the present disclosure. For those of ordinary skill in the art, other drawings can also be obtained based on these accompanying drawings without creative efforts.

DETAILED DESCRIPTION OF THE EMBODIMENTS

The present disclosure will be further described in detail below with reference to the accompanying drawings and embodiments. It is particularly pointed out that the following embodiments are only used to illustrate the present disclosure, but do not limit the scope of the present disclosure. Likewise, the following embodiments are only some rather than all embodiments of the present disclosure, and all other embodiments obtained by those skilled in the art without creative work fall within the protection scope of the present disclosure.

Figure 1:
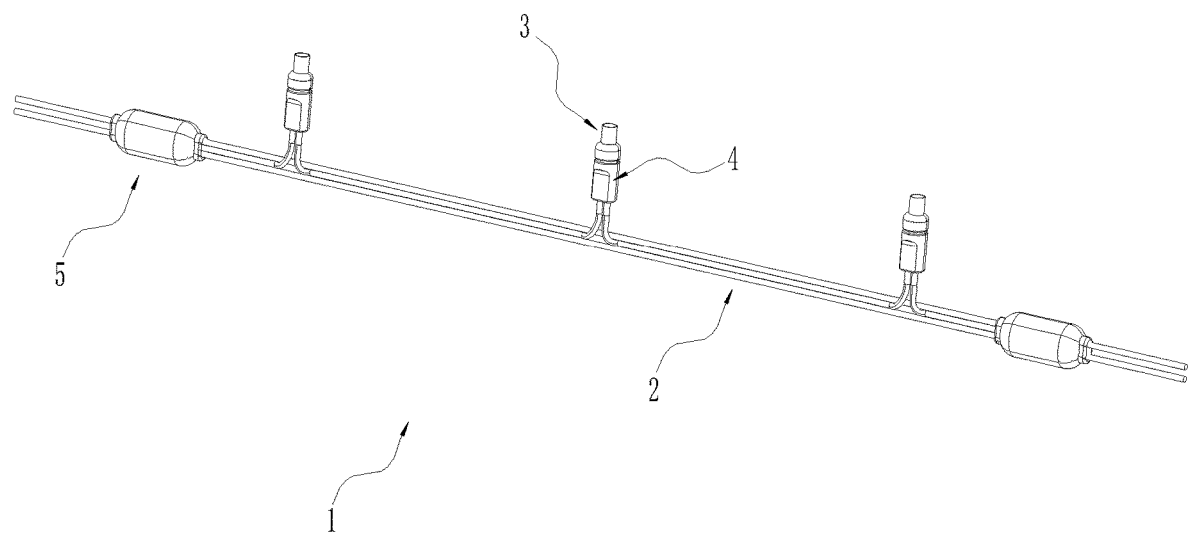
FIG. 1 is a schematic structural diagram of the light string briefly implemented according to an embodiment of the present disclosure, where the plug is not shown.
Figure 2:
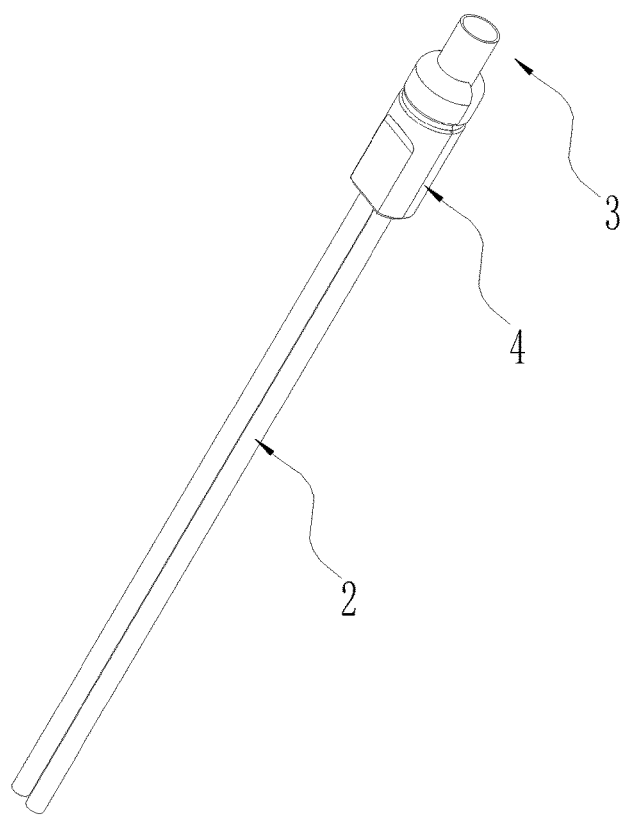
FIG. 2 is a schematic structural diagram briefly showing part of the LED lamp of the light string being encapsulated according to an embodiment of the present disclosure.
Figure 3:
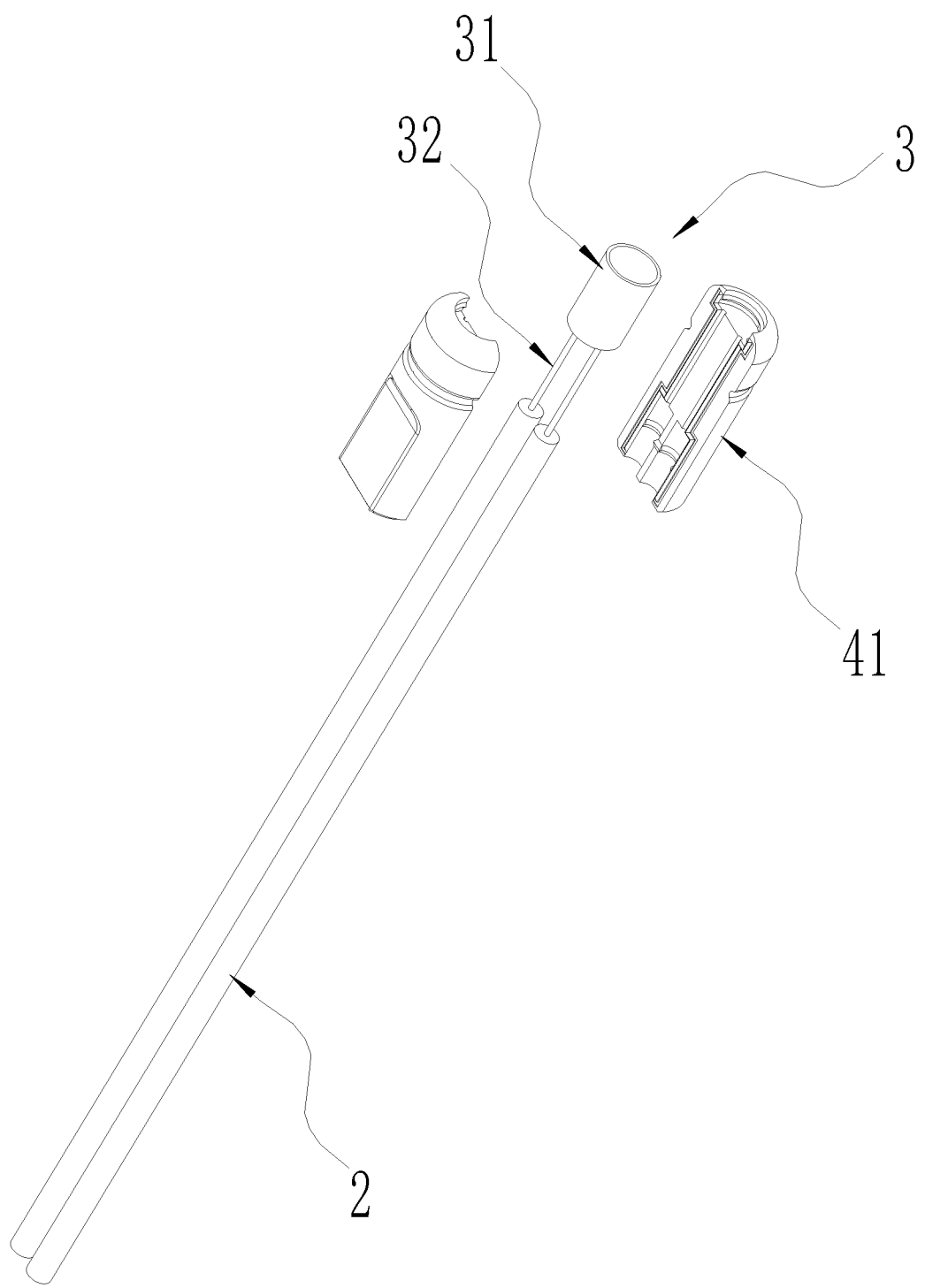
FIG. 3 is a schematic exploded view briefly showing part of the LED lamp of the light string being encapsulated according to an embodiment of the present disclosure.
Figure 4:
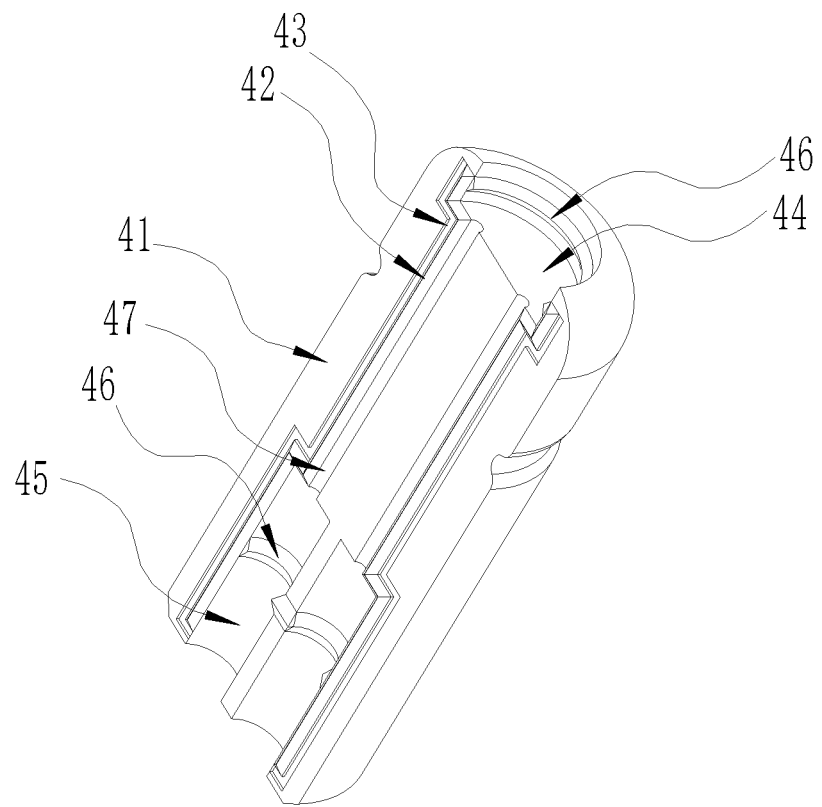
FIG. 4 is a schematic structural diagram of the plastic outer shell for encapsulating the LED lamp according to an embodiment of the present disclosure.

As shown in one of FIG. 1 to FIG. 9, the present embodiment provides the decorative light string 1. The decorative light string 1 includes the wire 2, two or more LED lamps 3 connected to the wire 2, a plug (routine technique not shown) connected to the wire 2, and the rectifier 6 connected to the wire 2 and the LED lamps 3. FIG. 1 further shows the light encapsulation structures 4 and 5 that are applied to the decorative light string of the present embodiment and suitable for ultrasonic welding.

The LED lamp 3 is encapsulated by the light encapsulation structure 4 suitable for ultrasonic welding described above; the plug and the rectifier 6 are encapsulated by the light encapsulation structure 5 suitable for ultrasonic welding described above.

Specifically, the light encapsulation structure 4, 5 suitable for ultrasonic welding mentioned in the present embodiment includes a pair of plastic outer shells 41, 51 with a symmetrical structure. Each of the plastic outer shells 41, 51 is internally provided with a profiling raceway to allow the wire or component of the decorative light string to pass through.

The plastic outer shell 41, 51 is provided with the first ultrasonic welding lines 42, 52 at two sides corresponding to the profiling raceway, and trajectories of the first ultrasonic welding lines 42, 52 are adapted to the side contour of the profiling raceway. The plastic outer shell 41, 51 is provided with the glue overflow grooves 43, 53 on the side close to or away from the profiling raceway relative to the first ultrasonic welding lines 42, 52.

Figure 5:
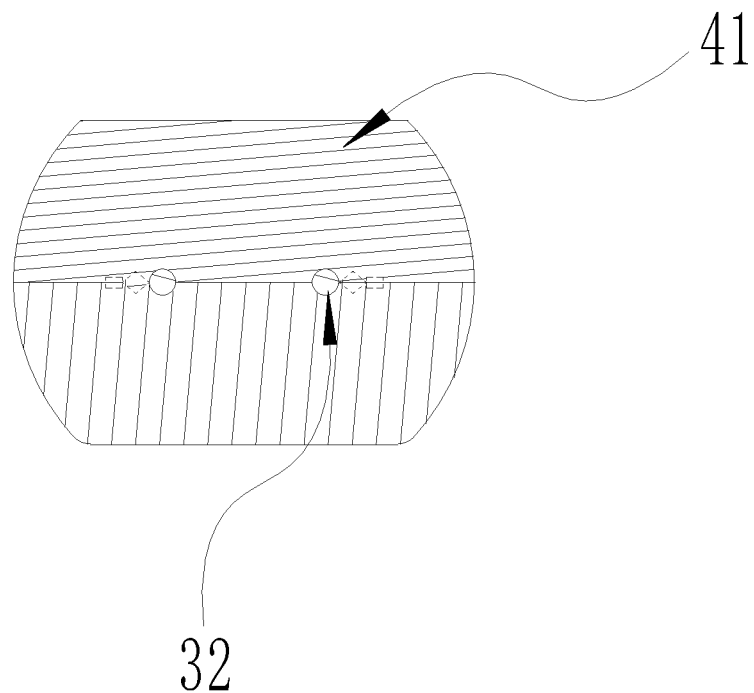
FIG. 5 is a schematic cross-sectional view briefly showing the LED lamp being encapsulated according to an embodiment of the present disclosure.
Figure 6:
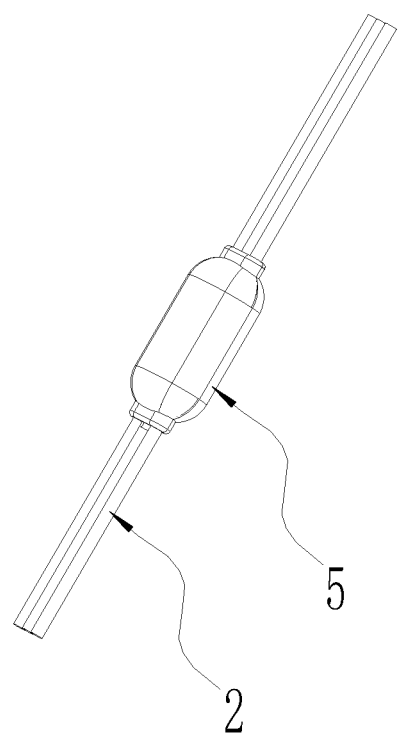
FIG. 6 is a diagram briefly showing part of the rectifier of the light string being encapsulated according to an embodiment of the present disclosure.
Figure 7:
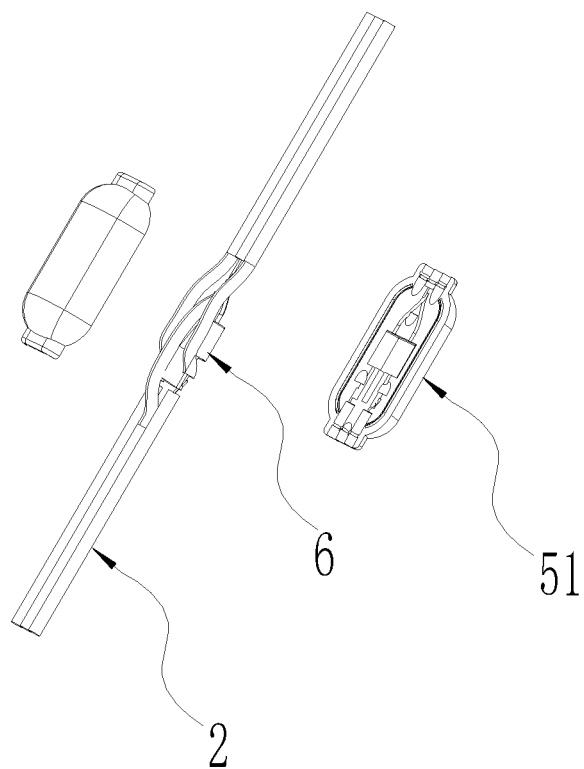
FIG. 7 is a schematic exploded view briefly showing part of the rectifier of the light string being encapsulated according to an embodiment of the present disclosure.
Figure 8:
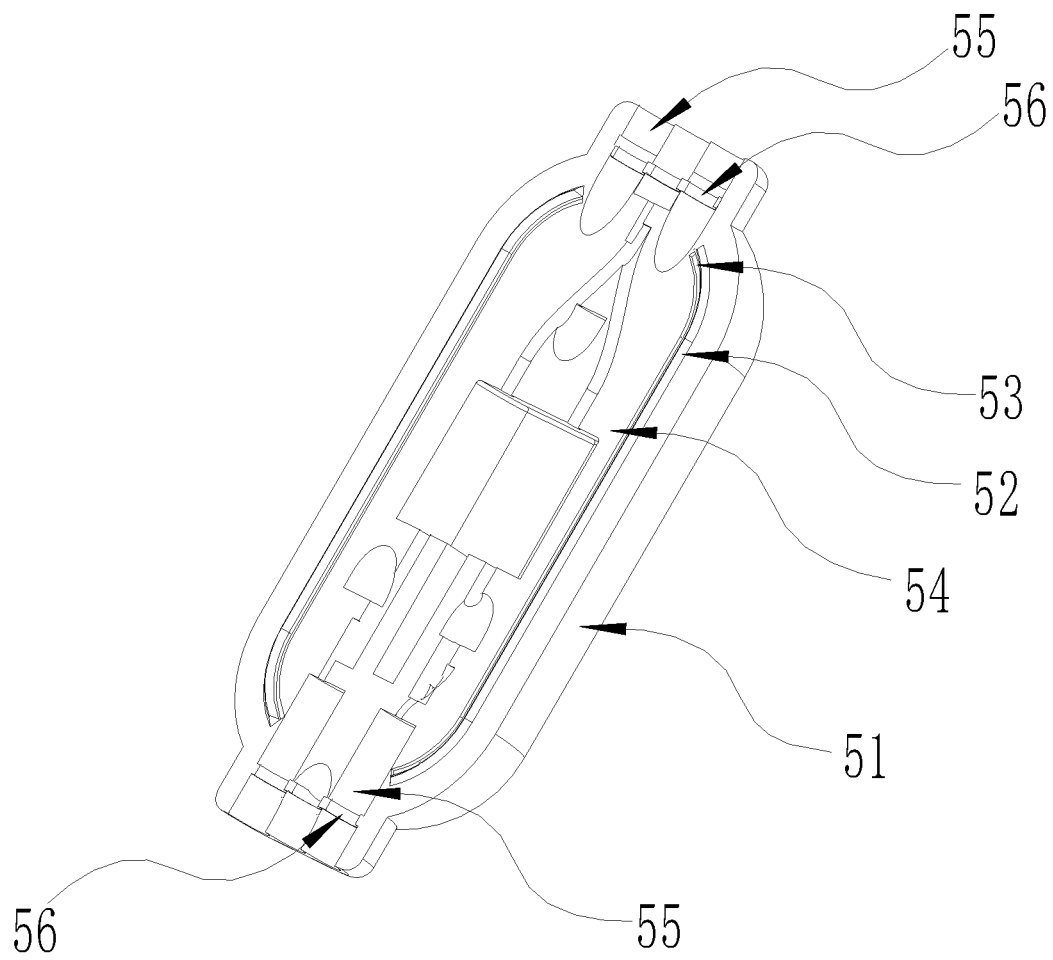
FIG. 8 is a schematic structural diagram of the plastic outer shell for encapsulating the rectifier according to an embodiment of the present disclosure.
Figure 9:
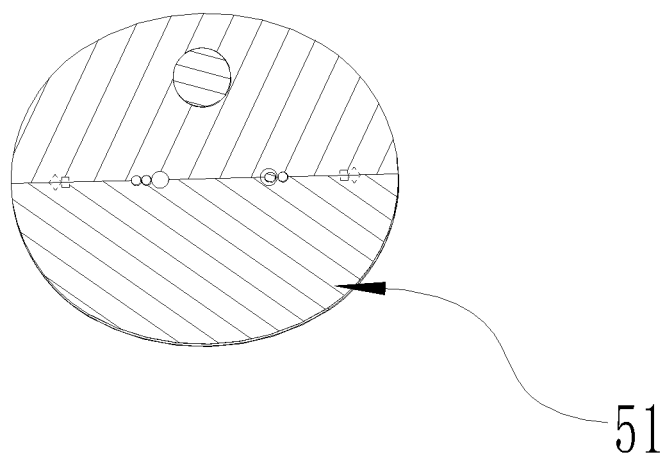
FIG. 9 is a schematic cross-sectional view briefly showing the rectifier being encapsulated according to an embodiment of the present disclosure.

In addition, as shown in FIG. 5 or FIG. 9, the pair of plastic outer shells 41, 51 are welded together to form a single piece by ultrasonic waves. During the ultrasonic welding, the first ultrasonic welding lines 42, 52 on the pair of plastic outer shells 41, 51 are subjected to heat melting due to vibration and friction to become soft and melted, and the excess part thereof fills the glue overflow grooves 43, 53. The diamond-shaped boxes in FIG. 5 and FIG. 9 indicate the contour of the first ultrasonic welding lines 42, 52 before the ultrasonic welding. The contour of the first ultrasonic welding lines 42, 52 is heated and melted due to friction in the ultrasonic welding, so that the pair of plastic outer shells 41, 51 are welded into a single piece. The rectangular boxes in FIG. 5 and FIG. 9 indicate the glue overflow grooves 43, 53 for collecting the excess part of the first ultrasonic welding lines 42, 52, which avoids the occurrence of burrs due to overflow of the excess part of the first ultrasonic welding lines from the edges of the pair of plastic outer shells 41, 51 and avoids the reduction of adhesion of the pair of plastic outer shells 41, 51 due to accumulation of the excess part of the first ultrasonic welding lines, thereby improving the sealing degree of ultrasonic welding.

In order to compact the structure and improve its water resistance and crack resistance, two ends of the profiling raceway described in the present embodiment are both provided with the second ultrasonic welding lines 46, 56. In the present embodiment, the first ultrasonic welding lines 42, 52 have a triangular cross-sectional contour before welding, and the second ultrasonic welding lines 46, 56 have a triangular or rectangular cross-sectional contour before welding.

Referring to FIG. 2 to FIG. 5, specifically for an encapsulation structure of the LED lamp 3, the present embodiment uses the light encapsulation structure 4, and the profiling raceway in the plastic outer shell 41 of the light encapsulation structure 4 includes:

the lamp holder insertion groove 44 arranged at one end of the plastic outer shell 41, wherein the contour of the lamp holder insertion groove 44 is adapted to the contour of the lamp holder 31 of the LED lamp 3, the lamp holder 31 of the LED lamp 3 is inserted into the lamp holder insertion groove 44, so that the lamp holder 31 is received inside the lamp holder insertion groove 44, the lamp holder insertion grooves 44 of the pair of plastic outer shells 41 enclose a lamp holder installation groove, and the lamp holder installation groove is in an interference fit with the lamp holder 31 of the LED lamp 3;

the first wire insertion groove 45 arranged at the other end of the plastic outer shell 41, wherein the contour of the first wire insertion groove 45 is adapted to the contour of the unstripped wire 2, the tail end of the wire 2 is inserted into the light encapsulation structure 4 through the first wire insertion groove 45 and connected to the lamp holder 31, so that the lamp holder 31 of the LED lamp 3 is electrically connected to the wire 2, the first wire insertion grooves 45 of the pair of plastic outer shells 41 enclose a first wire installation groove, and the first wire installation groove is in an interference fit with the wire 2;

the pin insertion groove 47 arranged between the lamp holder insertion groove 44 and the first wire insertion groove 45, wherein the lamp holder 31 is provided with the pin 32 for connecting with the wire 2, the contour of the pin insertion groove 47 is adapted to the contour of the pin 32 on the lamp holder 31, the pin 32 of the lamp holder 31 is inserted into the pin insertion groove 47, the tail end of the wire 2 is inserted into the pin insertion groove 47 for connecting with the pin 32 of the lamp holder 31, the pin insertion grooves 47 of the pair of plastic outer shells 41 enclose a pin installation groove, and the pin installation groove is in an interference fit with the pin 32.

As a preferred embodiment, the second ultrasonic welding lines 46 of the light encapsulation structure 4 for encapsulating the LED lamp 3 in the present embodiment are preferably located in the middle of the lamp holder insertion groove 44 and the middle of the first wire insertion groove 45 along an axial direction, respectively.

Referring to FIG. 6 to FIG. 9, for an encapsulation structure of the rectifier 6, the present embodiment uses the light encapsulation structure 5, and the profiling raceway in the plastic outer shell 51 of the light encapsulation structure 5 includes: a pair of second wire insertion grooves 55 and the rectifier assembly accommodating groove 54.

The pair of second wire insertion grooves 55 are respectively arranged at two ends of the plastic outer shell 51, and the rectifier assembly accommodating groove 54 is located between the pair of second wire insertion grooves 55. The second wire insertion grooves 55 of the pair of plastic outer shells 51 enclose a second wire installation groove, the second wire installation groove is in an interference fit with the wire 2, and the rectifier assembly accommodating grooves 54 of the pair of plastic outer shells 51 enclose a rectifier assembly installation groove. The rectifier 6 is arranged in the rectifier assembly accommodating grooves 54, and the wire 2 is inserted into the rectifier assembly accommodating grooves 54 through the second wire insertion grooves 55 at two ends of the plastic outer shell 51 and connected to the rectifier 6.

In addition, the second ultrasonic welding lines 56 of the light encapsulation structure 5 for encapsulating the rectifier 5 are respectively located in the middle of the pair of second wire insertion grooves 55 along an axial direction.

Based on the above, the present embodiment further provides an ultrasonic welding method for a lamp holder and a light string, which includes the decorative light string 1 described above. The welding method includes:

S01, placing one of a pair of plastic outer shells in the mold of ultrasonic welding equipment, placing the LED lamp, the rectifier, or the plug in a corresponding area of the profiling raceway of the plastic outer shell, and then loading the other plastic outer shell into the mold of the ultrasonic welding equipment to make the pair of plastic outer shells face each other;

S02, closing the mold of the ultrasonic welding equipment, and starting the ultrasonic welding equipment to weld the pair of plastic outer shells under preset working parameters until the welding is completed;

S03, opening the mold of the ultrasonic welding equipment, and taking out a welded workpiece, so that the ultrasonic welding of the LED lamp, the rectifier, or the plug is completed.

As a preferred embodiment, in S02 of the present embodiment, the ultrasonic welding is preferably conducted at an ultrasonic frequency of 20 KHz, a welding pressure of greater than or equal to 5 kg (such as 5, 6 or 7 kg, etc.), a delay time of 17-20 ms, a welding time of 20 ms, and a curing time of 20 ms.

The above descriptions are only part of the embodiments of the present disclosure and are not intended to limit the protection scope of the present disclosure. Any equivalent device or equivalent process transformation made based on the contents of the specification and drawings of the present disclosure, directly or indirectly applied to other related technical fields, are all likewise included in the protection scope of the present disclosure.

What is claimed is:

1. A decorative light string, comprising a wire and two or more LED lamps connected to the wire, wherein the LED lamps each comprise a light encapsulation structure suitable for ultrasonic welding, which comprises a pair of plastic outer shells with a symmetrical structure, wherein
   each of the plastic outer shells is internally provided with a profiling raceway to allow a wire or a component of a decorative light fixture to pass through;
   the plastic outer shell is provided with first ultrasonic welding lines at two sides corresponding to the profiling raceway, trajectories of the first ultrasonic welding lines are adapted to a side contour of the profiling raceway, and the plastic outer shell is provided with glue overflow grooves on a side close to or away from the profiling raceway relative to the first ultrasonic welding lines;
   the pair of plastic outer shells are welded together to form a single piece by ultrasonic waves, during the ultrasonic welding, the first ultrasonic welding lines on the pair of plastic outer shells are subjected to heat melting due to vibration and friction to become soft and melted, and an excess part thereof fills the glue overflow grooves;
   two ends of the profiling raceway are both provided with second ultrasonic welding lines; and
   the first ultrasonic welding lines and/or the second ultrasonic welding lines have a triangular or rectangular cross-sectional contour before welding;
   the profiling raceway in the plastic outer shell of the light encapsulation structure for encapsulating the LED lamp comprises:
   a lamp holder insertion groove arranged at one end of the plastic outer shell, wherein a contour of the lamp holder insertion groove is adapted to a contour of a lamp holder of the LED lamp, the lamp holder of the LED lamp is inserted into the lamp holder insertion groove, so that the lamp holder is received inside the lamp holder insertion groove, the lamp holder insertion grooves of the pair of plastic outer shells enclose a lamp holder installation groove, and the lamp holder installation groove is in an interference fit with the lamp holder of the LED lamp;
   a first wire insertion groove arranged at the other end of the plastic outer shell, wherein a contour of the first wire insertion groove is adapted to a contour of an unstripped wire, a tail end of the wire is inserted into the light encapsulation structure through the first wire insertion groove and connected to the lamp holder, so that the lamp holder of the LED lamp is electrically connected to the wire, the first wire insertion grooves of the pair of plastic outer shells enclose a first wire installation groove, and the first wire installation groove is in an interference fit with the wire;
   a pin insertion groove arranged between the lamp holder insertion groove and the first wire insertion groove, wherein the lamp holder is provided with a pin for connecting with the wire, a contour of the pin insertion groove is adapted to a contour of the pin on the lamp holder, the pin of the lamp holder is inserted into the pin insertion groove, the tail end of the wire is inserted into the pin insertion groove for connecting with the pin of the lamp holder, and the pin insertion grooves of the pair of plastic outer shells enclose a pin installation groove.

2. The decorative light string according to claim 1, wherein the second ultrasonic welding lines of the light encapsulation structure for encapsulating the LED lamp are located in a middle of the lamp holder insertion groove and a middle of the first wire insertion groove along an axial direction, respectively.

3. The decorative light string according to claim 1, further comprising a plug connected to the wire and a rectifier connected to the wire and the LED lamp, wherein the plug and/or the rectifier are/is encapsulated by the light encapsulation structure suitable for ultrasonic welding.

4. The decorative light string according to claim 3, wherein
   the profiling raceway in the plastic outer shell of the light encapsulation structure for encapsulating the rectifier comprises: a pair of second wire insertion grooves and a rectifier assembly accommodating groove,
   the pair of second wire insertion grooves are respectively arranged at two ends of the plastic outer shell, and the rectifier assembly accommodating groove is located between the pair of second wire insertion grooves, the second wire insertion grooves of the pair of plastic outer shells enclose a second wire installation groove, the second wire installation groove is in an interference fit with the wire, the rectifier assembly accommodating grooves of the pair of plastic outer shells enclose a rectifier assembly installation groove, the rectifier is arranged in the rectifier assembly accommodating grooves, and the wire is inserted into the rectifier assembly accommodating grooves through the second wire insertion grooves at two ends of the plastic outer shell and connected to the rectifier;

the second ultrasonic welding lines of the light encapsulation structure for encapsulating the rectifier are respectively located in a middle of the pair of second wire insertion grooves along an axial direction.

5. An ultrasonic welding method for a light encapsulation structure, wherein the light encapsulation structure comprises a pair of plastic outer shells with a symmetrical structure, each of the plastic outer shells is internally provided with a profiling raceway to allow a wire or a component of a decorative light fixture to pass through;

the plastic outer shell is provided with first ultrasonic welding lines at two sides corresponding to the profiling raceway, trajectories of the first ultrasonic welding lines are adapted to a side contour of the profiling raceway, and the plastic outer shell is provided with glue overflow grooves on a side close to or away from the profiling raceway relative to the first ultrasonic welding lines;

the pair of plastic outer shells are welded together to form a single piece by ultrasonic waves, during the ultrasonic welding, the first ultrasonic welding lines on the pair of plastic outer shells are subjected to heat melting due to vibration and friction to become soft and melted, and an excess part thereof fills the glue overflow grooves;

two ends of the profiling raceway are both provided with second ultrasonic welding lines; and the first ultrasonic welding lines and/or the second ultrasonic welding lines have a triangular or rectangular cross-sectional contour before welding;

the method comprises:

S01, placing one of the pair of plastic outer shells in a mold of ultrasonic welding equipment, placing an LED lamp, a rectifier, or a plug in a corresponding area of the profiling raceway of the plastic outer shell, and then loading the other plastic outer shell into the mold of the ultrasonic welding equipment to make the pair of plastic outer shells face each other;

S02, closing the mold of the ultrasonic welding equipment, and starting the ultrasonic welding equipment to weld the pair of plastic outer shells under preset working parameters until the welding is completed;

S03, opening the mold of the ultrasonic welding equipment, and taking out a welded workpiece, so that the ultrasonic welding of the LED lamp, the rectifier, or the plug is completed.

6. The ultrasonic welding method for a light encapsulation structure according to claim 5, wherein in S02, the ultrasonic welding is conducted at an ultrasonic frequency of 20 KHz, a welding pressure of more than 5 kg, a delay time of 17-20 ms, a welding time of 20 ms, and a curing time of 20 ms.

* * * * *